United States Patent
Yamada et al.

[11] Patent Number: 6,086,500
[45] Date of Patent: Jul. 11, 2000

[54] TOOTHED BELT

[75] Inventors: Mitsuho Yamada, Osaka; Atsushi Matsuki, Neyagawa; Shigehiro Isshiki; Hiroshi Kida, both of Yamatokooriyama, all of Japan

[73] Assignees: Ashimori Industry Co., Ltd.; Unitta Co., Ltd., both of Osaka, Japan

[21] Appl. No.: 09/202,048

[22] PCT Filed: Apr. 7, 1998

[86] PCT No.: PCT/JP98/01588

§ 371 Date: Dec. 7, 1998

§ 102(e) Date: Dec. 7, 1998

[87] PCT Pub. No.: WO98/45617

PCT Pub. Date: Oct. 15, 1998

[30] Foreign Application Priority Data

Apr. 7, 1997 [JP] Japan ................................. 9-105188

[51] Int. Cl.⁷ .................................................. F16G 1/00
[52] U.S. Cl. .................... 474/202; 474/204; 474/260; 474/268
[58] Field of Search .................... 474/202–205, 474/260, 266, 267, 265, 84, 148, 264; 428/34.5, 379, 396, 492; 57/284, 352, 225, 243

[56] References Cited

U.S. PATENT DOCUMENTS

| | | | |
|---|---|---|---|
| 4,219,996 | 9/1980 | Edgawa et al. | 57/225 |
| 4,826,472 | 5/1989 | Sato . | |
| 5,346,731 | 9/1994 | Nakanishi | 474/268 X |
| 5,382,200 | 1/1995 | Kimoto | 474/260 |
| 5,406,782 | 4/1995 | Inuyama et al. | 57/284 |
| 5,876,297 | 3/1999 | Takeuchi | 474/202 |

FOREIGN PATENT DOCUMENTS

| | | |
|---|---|---|
| 715871 | 6/1988 | European Pat. Off. . |
| 893581 | 3/1994 | European Pat. Off. . |
| 57-165237 | 10/1982 | Japan . |
| 204059 | 12/1987 | Japan . |
| 109076 | 4/1994 | Japan . |
| 217704 | 8/1995 | Japan . |
| 226495 | 9/1996 | Japan . |
| 312724 | 11/1996 | Japan . |
| 32886 | 2/1997 | Japan . |
| 9100879 | 4/1997 | Japan . |
| 9119483 | 5/1997 | Japan . |

*Primary Examiner*—David A. Bucci
*Assistant Examiner*—Marcus Charles
*Attorney, Agent, or Firm*—Birch, Stewart, Kolasch & Birch LLP

[57] ABSTRACT

A toothed belt with improved durability and low noise level during operation having a foundation fabric 2 adhesive-bonded along the engaging surface 5 thereof, wherein the yarns of said foundation fabric 2 extending in the longitudinal direction of the toothed belt comprise a plurality of false-twisted yarns false-twisted in the same false twist direction; the foundation fabric 2 is formed by weaving said yarns and the yarns crossing said yarns in a double-faced twill pattern and is located where the face of said foundation fabric 2 with fewer of said exposed false-twisted yarns is exposed to the front face.

9 Claims, 5 Drawing Sheets

TOOTHED BELT

This application is the national phase under 35 U.S.C. §371 of prior PCT International Application No. PCT/JP98/01588 which has an International filing date of Apr. 7, 1998 which designated the United States of America.

FIELD OF THE INVENTION

The present invention relates to a toothed belt, and more particularly relates to an improvement of the foundation fabric of a toothed belt to whose engaging surfaces a foundation fabric is adhesive-bonded.

The present invention further relates to an improved woven fabric used as foundation fabric of a toothed belt.

BACKGROUND OF THE INVENTION

Toothed belts to whose engaging surfaces a foundation fabric is adhesive-bonded for the purpose of protecting the surface are known from JP, U 62-204059 (U.S. Pat. No. 4,826,472; EP-B1 0 271 587) and other publications; however, in the foundation fabric thereof crimped yarns of synthetic fibers are used as weft yarns extending in the longitudinal direction of the toothed belt. These toothed belts are formed, as shown in FIG. 2, by locating a foundation fabric 2, tensil cords 3 and unvulcanized rubber 4 on a mold 1 having protrusions and recesses on its surface and by vulcanizing the unvulcanized rubber 4 by applying heat and pressure thereto; and, as shown in FIG. 3, the belt teeth 6 are formed on the engaging surface along the recesses of the mold 1. I.e., a requirement of said foundation fabric 2 is that it must be capable of being elongated during its formation by being subjected to low loads by as much as some ten percent from a predominantly flat condition to a condition in which it follows the protrusions and recesses of the mold 1. Accordingly, crimped yarns of synthetic fibers are used in this woven fabric 2 as weft yarns extending in the longitudinal direction of the toothed belt, so that the woven fabric can be easily elongated by stretching the crimps.

The foundation fabric of conventional toothed belts is woven in a 2/2 double-faced twill pattern, and false-twisted yarns of different false twist directions are combined in parallel and used as weft yarn so that the exposure condition of the yarns on both faces is equal.

Toothed belts require adequate durability because, being operated at high speeds while rotating on pulleys, repeated bending creates forces which may tear the foundation fabric off the engaging surface of the belt; there are even cases in which the foundation fabric has actually been torn off due to long use. Further, when the toothed belt is in operation, a momentum is transmitted by the engagement of the tooth profile of the toothed belt with the tooth profile of the pulleys; therefore, sounds are produced by the collision of the tooth surfaces when the tooth profiles engage, the friction between the tooth surfaces during rotation, the friction occurring when the toothed belt separates from the pulley, etc.; moreover, currents of air occur rapidly when the tooth profiles engage and disengage, producing a disagreeable noise.

These problems have hardly been addressed in the conventional toothed belts described above, which, lacking in durability, do not endure long periods of use, and which produce a fairly loud noise during operation.

SUMMARY OF THE INVENTION

Having reflected on the above circumstances, it is the object of the present invention to provide a toothed belt which, compared to conventional toothed belts, has improved durability and produces less noise during operation.

The inventors of the present invention, while making diligent studies to achieve this object, accomplished the present invention by discovering that the above-mentioned problems can all be solved at the same time by using a woven fabric, woven with weft yarns comprising a plurality of false-twisted yarns that are false-twisted in the same false twist direction as weft yarns, as foundation fabric of a toothed belt. Because the weft yarns of the fabric are false-twisted in the same direction, the exposure of these yarns is not the same on both sides of the fabric. That is, one side of the fabric will exhibit a greater exposure of these yarns than the other side.

I.e., the present invention relates to a toothed belt having a foundation fabric adhesive-bonded along the engaging surface thereof, wherein the yarns of said foundation fabric extending in the longitudinal direction of the toothed belt comprise a plurality of false-twisted yarns false-twisted in the same false twist direction; the foundation fabric is formed by weaving said yarns and the yarns crossing said yarns in a double-faced twill pattern and is adhesive-bonded to the engaging surface, so that the face of said foundation fabric with fewer of said exposed false-twisted yarns is exposed to the front.

The present invention further relates to a woven fabric adhesive-bonded along the engaging surface of a toothed belt and having weft yarns extending in the longitudinal direction of the toothed belt; wherein said woven fabric is woven from yarns comprising a plurality of false-twisted yarns twisted in the same false twist direction and yarns crossing said yarns in a double-faced twill pattern, and the exposure condition of yarns on the front and back face is different.

The exposure condition of yarns of the woven fabric of the present invention is different on the front face and on the back face. The fibers, crimped by false twisting, incline toward and are exposed on one face, contributing to the stronger adhesive bonding with the rubber on the other face, the amount of exposed crimped fibers is small, but distinct twill lines appear with protrusions and recesses, contributing to the reduction of the noise level during contact with the pulley.

In the present invention, any yarns comprising a plurality of false-twisted yarns false-twisted in the same false twist direction may be used as yarns extending in the longitudinal direction of the toothed belt; as embodiments thereof, e.g. , a plurality of said false-twisted yarns, simply combined in parallel, twisted together in the same direction as the false twist direction, or twisted in the opposite direction of their false twist direction, are equally preferred; however, yarns together twisted in the opposite direction of the false twist direction of their false-twisted yarns are more preferable, because of their bulkiness which is due to the severe crimping of their fibers when the false twist is back-twisted (untwisted).

Further, the before-mentioned foundation fabric is most commonly formed as a tube by sewing etc. a woven fabric woven from warp yarns comprising normal synthetic fibers and weft yarns comprising the before-mentioned crimped yarns, said foundation fabric is then fitted onto the mold 1 to form the toothed belt. Consequently, regarding the usage of the terms "warp yarns" and "weft yarns" in this specification, the yarns extending in the longitudinal direction of the toothed belt are called "weft yarns", and the yarns extending in a direction crossing the first yarns are designated as "warp yarns"; however, the terms warp and weft yarns in weaving technology do not necessarily correspond to this usage, in fact in some cases the opposite applies.

DETAILED DESCRIPTION OF PREFERRED EMBODIMENTS

Below, the present invention will be described based on the drawings. The embodiments below have the aim of describing the present invention in greater detail; it goes without saying that the invention is not limited thereby.

Figure 1:
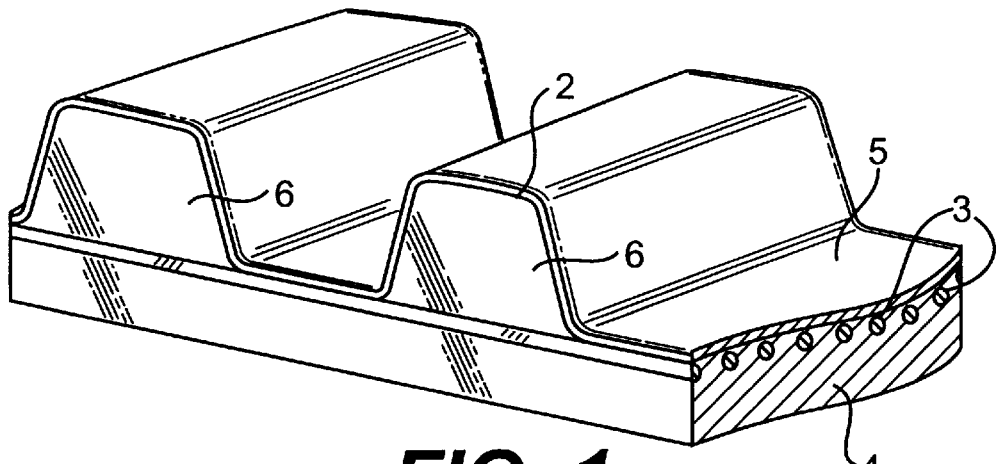
FIG. 1 is a perspective view of a toothed belt according to the present invention.

FIG. 1 shows a toothed belt according to the present invention, wherein tensil cords 3 is embedded in rubber 4, on one side of which belt teeth 6 are formed, and on whose engaging surface 5 a foundation fabric 2 is adhesive-bonded.

The weft yarns in the foundation fabric 2 of this toothed belt are made of nylon or other synthetic fibers and comprise a plurality of false-twisted yarns false-twisted in the same false twist direction. In the present invention, these yarns can be used as those which are simply combined in parallel or those which are together twisted in the same direction as the false twist direction of the false-twisted yarns. Nylon or other normal synthetic fiber filaments or yarns suitably twisted are used as warp yarns, and the foundation fabric 2 is formed by weaving the warp yarns and the weft yarns as a 2/2 twill or other double-faced twill weave. In a foundation fabric 2 thus constituted, the false-twisted yarns which constitute the weft yarns have the tendency to incline toward and be exposed on one face of the foundation fabric 2. E.g., if the false twist direction of the false-twisted yarns is an S-twist, the yarns have the tendency to be exposed on the face with the twill lines in the twill weave of the foundation fabric 2 rising toward the right, and if the false twist direction of the false-twisted yarns is a Z-twist, the yarns have the tendency to be exposed on the face with the twill lines rising toward the left.

Conventionally, except for the direction of the twill lines, the front face and the back face of a double-faced twill weave have the same texture, and the warp and weft yarns are also exposed equally on the front and the back. Consequently, the concept of a face on which more weft yarns are exposed than on the other face does not exist. However, in a case, as in the present invention, in which the yarns of doubled and twisted false-twisted yarns with the same false twist direction are used as weft yarns, these false-twisted yarns incline toward and are exposed on one face of the foundation fabric 2, and the fibers, crimped by false twisting, incline towards and protrude from this face of the foundation fabric 2, while almost no crimped fibers protrude from the opposite face where distinct twill lines appear with protrusions and recesses; the front face and the back face therefore present a clear difference in their respective external appearance.

Figure 5A:
FIG. 5a is a photograph of the surface of a foundation fabric on the pulley side in example 1.
Figure 5B:
FIG. 5b is a photograph of the surface of a foundation fabric on the rubber side in example 1.
Figure 6A:
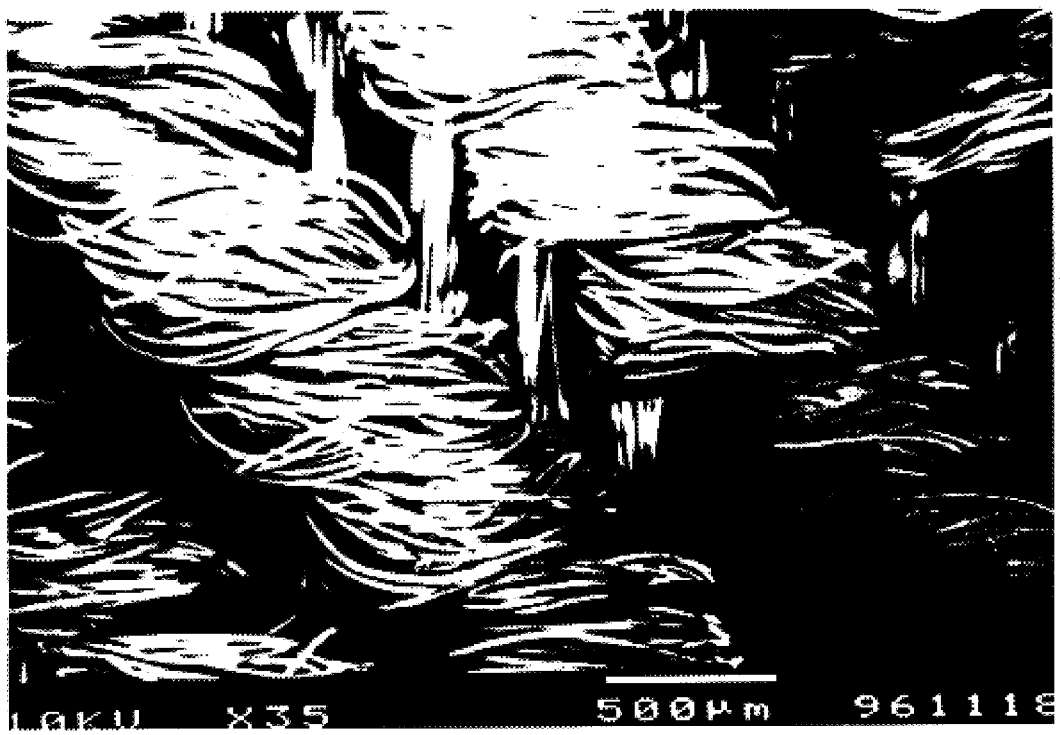
FIG. 6a is a photograph of the surface of a foundation fabric on the pulley side in example 2.
Figure 6B:
FIG. 6b is a photograph of the surface of a foundation fabric on the rubber side in example 2.
Figure 7A:
FIG. 7a is a photograph of the surface of a conventional foundation fabric on the pulley side explained in the background of the invention.
Figure 7B:
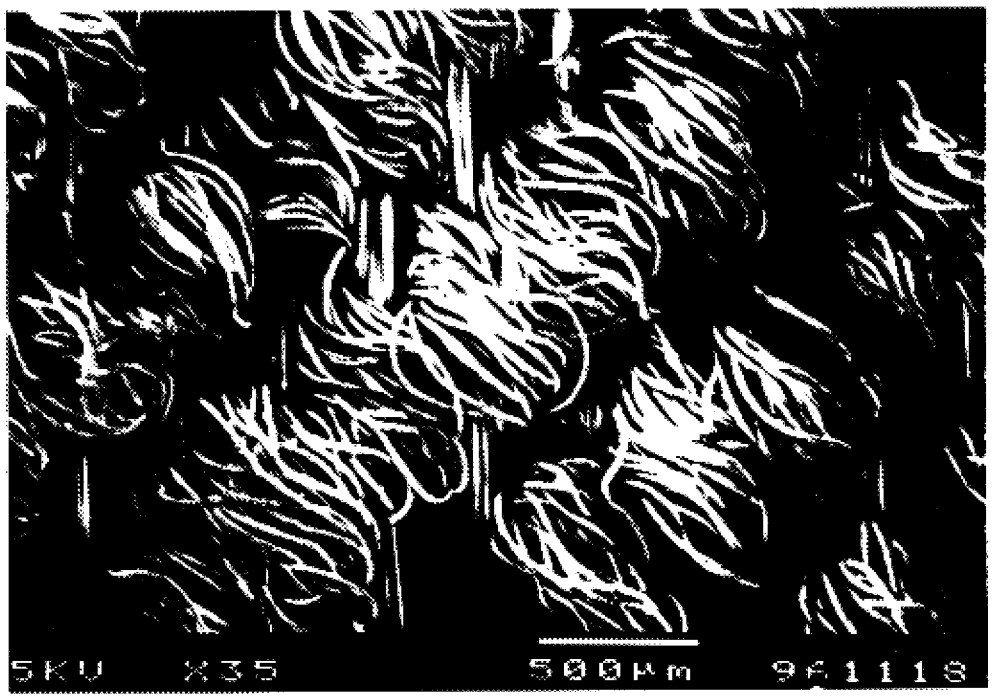
FIG. 7b is a photograph of the surface of a conventional foundation fabric on the rubber side explained in the background of the invention.

Further, FIGS. 5a, 5b (Example 1) and FIGS. 6a, 6b (Example 2) are photographs of the configuration of the front and back face of the foundation fabric of a toothed belt according to the invention of the present application. I.e., crimped fibers protrude from one side (FIGS. 5b, 6b), while they hardly protrude from the other side (FIGS. 5a, 6a) where distinct twill lines with protrusions and recesses appear. In Example 1, this tendency is more pronounced than in Example 2. By contrast, FIGS. 7a, 7b are photographs of the configuration of the front and back face of a foundation fabric of conventional toothed belts explained in the Background of the Invention, i.e. the foundation fabric using a plurality of false-twisted yarns false twisted in different false twist directions as weft yarns. Here, the difference between the front face and the back face does not appear clearly.

The reasons for which the foundation fabric according to the invention of the present application presents an appearance as that described above are not necessarily clear; however, it is thought that maybe because there is only one false twist direction of the false-twisted yarns constituting the weft yarns, a torque in the opposite direction of the false twist direction is generated, etc., and that based on the force thus generated and based on the relation between the arrangement of the weft yarns and of the warp yarns, the false-twisted yarns are only exposed on one face of the foundation fabric 2.

Figure 2:
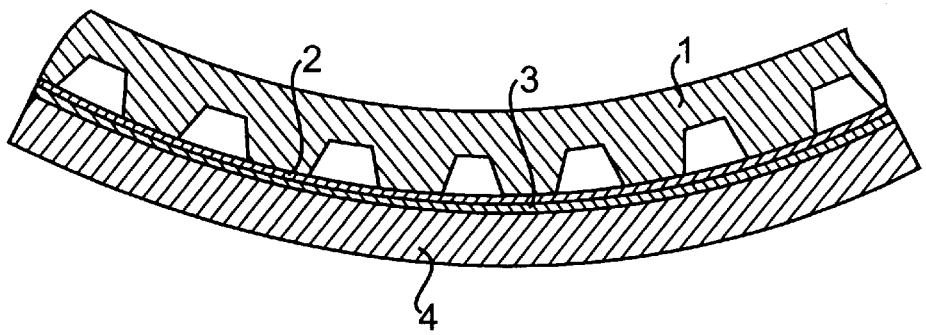
FIG. 2 is a cross-sectional view showing a preparatory stage for molding a toothed belt according to the present invention.
Figure 3:
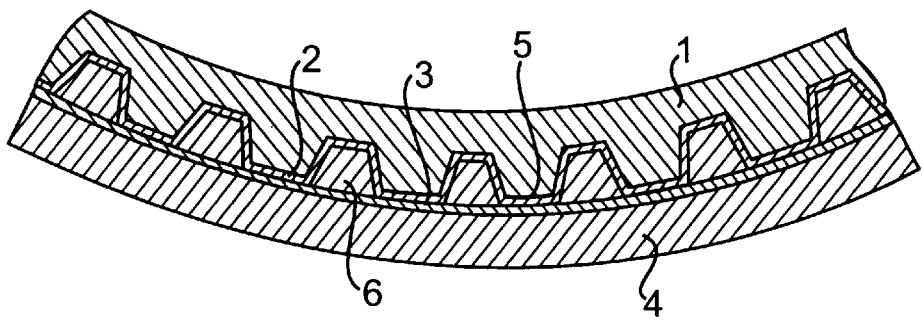
FIG. 3 is a cross-sectional view showing the molding of a toothed belt according to the present invention.

When molding a toothed belt with the foundation fabric 2, said foundation fabric is located and adhesive-bonded so that the face on which more of said false-twisted yarns are exposed in said foundation fabric 2 is in contact with the rubber 4 and the face on which fewer false-twisted yarns are exposed is exposed to the engaging surface 5. For adhesive-bonding the foundation fabric 2 to the engaging surface 5, the same method as that described concerning FIGS. 2 and 3 can be adopted.

In the present invention, the foundation fabric 2 is formed by weaving weft yarns comprising a plurality of false-twisted yarns false twisted in the same false twist direction which are combined in parallel or which are together twisted, and matching warp yarns into a double-faced twill; therefore the false-twisted yarns constituting the weft yarns incline toward and are exposed on one face, as mentioned before, and the crimped fibers protrude from this face in great number. Further, as the face from which a great number of crimped fibers protrude are adhesive-bonded to rubber 4, many crimped fibers are cross-linked with the rubber. Moreover, when twisting the false-twisted yarns together in the opposite direction of their false twist direction, the fibers, being severely crimped by the untwisting of the false twist, become bulky. Therefore, the adhesive strength is improved by the strong anchor effect joining the foundation fabric 2 and the rubber 4, and the durability of the toothed belt is greatly improved without the danger of the foundation fabric 2 being torn off the engaging surface 5 by bending.

Further, distinct twill lines appear and protrusions and recesses are formed on the face of the foundation fabric 2 exposed to the outside, from which almost no crimped fibers protrude. Therefore, the protrusions and recesses of the foundation fabric 2 appear as they are on the engaging surface 5 of the toothed belt, and the air caught between the pulley and the toothed belt when the former comes into contact with the latter can escape through these protrusions and recesses, and since air is fed through the protrusions and recesses when the toothed belt separates from the pulley, the noise level is reduced during engagement and disengagement.

INDUSTRIAL APPLICABILITY

According to the present invention, the adhesive strength is improved by the strong anchor effect joining the foundation fabric 2 and the rubber 4, and the durability of the toothed belt is greatly improved without the danger of the foundation fabric 2 being torn off the engaging surface 5 by bending. Further, according to the present invention, the noise produced between the teeth of the toothed belt and the teeth of the pulley is greatly reduced and quiet operations become possible because of the protrusions and recesses formed on the engaging surface of the toothed belt.

Consequently, toothed belts according to the present invention are extremely useful for car engines etc., which require durable and quiet operations.

EXAMPLES

Example 1

As warp yarns of the foundation fabric were used 210 d/35 f nylon 66 multi-filament yarns.

As weft yarns of this foundation fabric were used two doubled false-twisted yarns of 70 d/34 f nylon 66 multi-filament yarns false twisted in the S-twist direction with 2700 t.p.m. while being heated at 230° C., which were combined in parallel and twisted in three sets in the Z-twist direction with 100 t.p.m.

The foundation fabric was formed by weaving the above-mentioned warp yarns with a picked number of 86 threads per inch and the above-mentioned weft yarns with a picked number of 85 threads per inch in a 2/2 twill pattern. In this foundation fabric, the false twisted-yarns inclined toward and were exposed on one face of the foundation fabric, with a multitude of crimped fibers protruding from this face, while almost no crimped fibers protruded from the opposite face where distinct protrusions and recesses appeared in the direction of the twill lines.

An adhesive treatment was performed on the foundation fabric, the foundation fabric was located so that the face with the exposed false-twisted yarns was brought into contact with the rubber, and a toothed belt with 9.525 mm pitch, 92 teeth and a width of 19 mm was molded.

Example 2

Except for using the S-twist direction for twisting the doubled yarns in the constitution of the before-mentioned weft yarns, Example 2 was prepared and a toothed belt was molded in the same way as in Example 1.

Comparative Example 1

A toothed belt was molded with the foundation fabric formed in Example 1 with the front and back faces located in the opposite direction of Example 1.

Comparative Example 2

Except for combining in parallel one false-twisted yarn false twisted in the S-twist direction and one false-twisted yarn false twisted in the Z-twist direction in the constitution of the before-mentioned weft yarns, this Example was prepared and a toothed belt was molded in the same way as in Example 1.

Test Methods

Regarding the toothed belts of the above Examples and Comparative Examples, the adhesive strength between the foundation fabric 2 and the engaging surface 5, the running endurance of the toothed belts, and the noise level during the operation of the toothed belts were tested.

Adhesive strength: Regarding the toothed belts of the Examples and Comparative Examples, the peel strength between the foundation fabric 2 and the rubber 4 in the longitudinal direction of the toothed belt was measured by a Schopper tensile strength tester.

Running endurance (accelerated aging): The belts of the Examples and Comparative Examples were mounted to and run in the test apparatus shown in FIG. 4, the surface condition of the engaging surface of the toothed belts was observed, and the durability time of the toothed belts was measured. The test was halted when cracks occurred or when abnormal wear was observed on the engaging surface.

Figure 4:
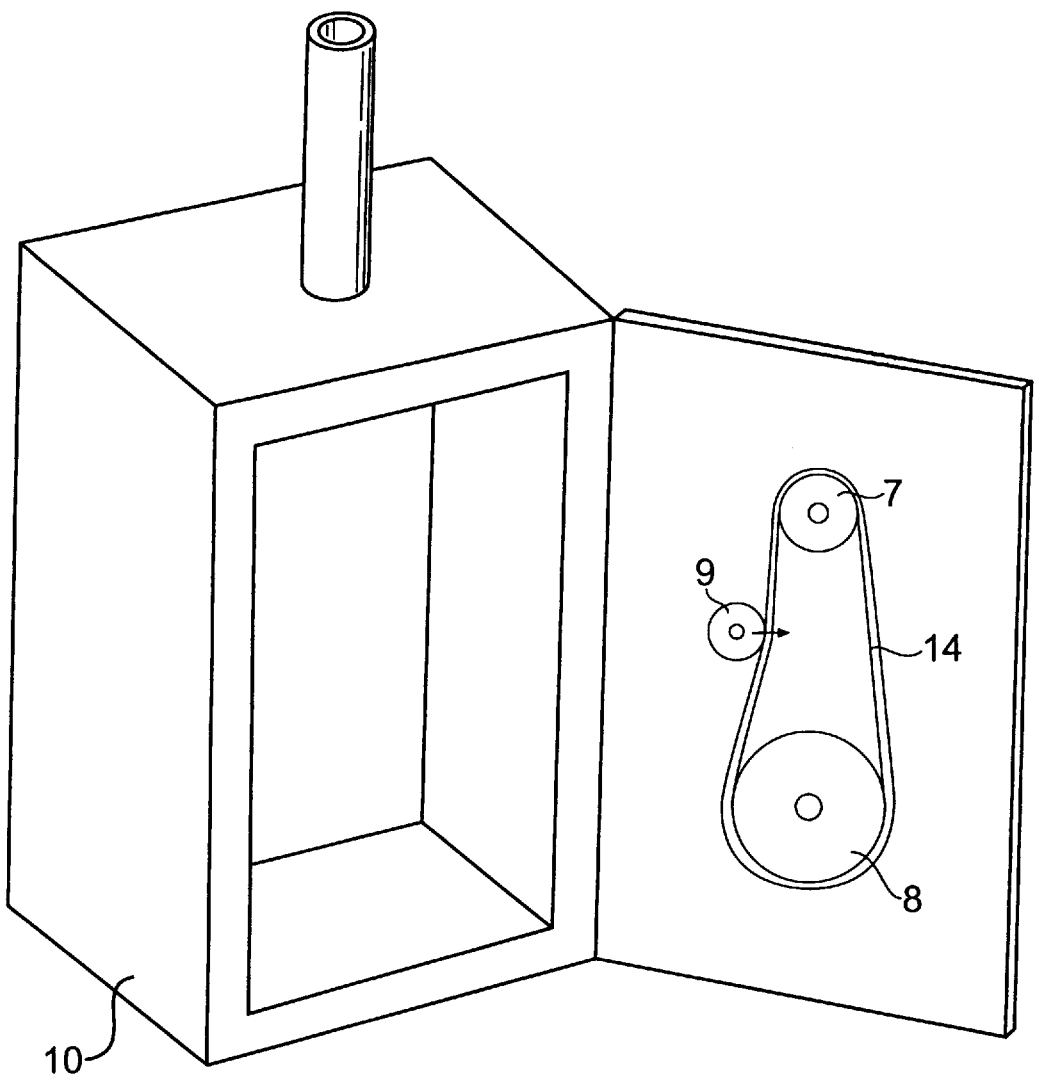
FIG. 4 is a perspective view of a running endurance testing (accelerated aging testing) apparatus.

In the test apparatus shown in FIG. 4, a drive pulley 7 with 20 teeth and a driven pulley 8 with 40 teeth are located at a distance of 285 mm from each other, a toothed belt 14 is mounted around the pulleys 7, 8, a constant tension is applied to the back face of the toothed belt 14 by means of an idler pulley 9, and the drive pulley 7 is rotating at a speed of 6000 r.p.m. This test apparatus is accommodated inside a box 10 into which hot air can be blown to heat the inside of the box 10 to a temperature of 100° C. so as to perform an accelerated aging test in a heated atmosphere.

Noise level: The toothed belt was fitted to a firing engine and installed so as to have a tension of 20–25 kgf, the noise level meter was installed 50 mm in front of the disengaging portion of the pulley, and the noise level was measured while operating the engine at 3000 r.p.m.

The test results are shown in Table 1.

TABLE 1

|  |  | Example 1 | Example 2 | Comp. Example 1 | Comp. Example 2 |
|---|---|---|---|---|---|
| Adhesive strength (Kgf/19 mm) | Tooth lower part | 8.8 | 8.0 | 6.8 | 7.3 |
|  | Tooth upper part | 54.9 | 45.6 | 41.3 | 48.1 |
| Running endurance | Average durability (hr) | 1620 | 1438 | 1122 | 1337 |
|  | Surface condition of the engaging surface when halting the test | • No wear<br>• Few minute cracks | • No wear<br>• Multitude of minute cracks | • Slight wear<br>• Cracks | • No wear<br>• Multitude of minute cracks |
| Noise level (dB) |  | 89–91 | 93–97 | 100–104 | 96–100 |

As can be seen from the above test results, the toothed belts according to the present invention (Examples 1 and 2) are endowed with improved durability and a low noise level, and make possible quiet operation over long periods of time. By contrast, in the conventional toothed belt, as is clear from Comparative Example 2, the adhesive strength between the foundation fabric and the rubber is low, and during the running test cracks occurred, which, even though minute, appeared in great number; in comparison to the toothed belt according to the present invention, the conventional toothed belt exhibited inferior durability and a higher noise level. Moreover, even when using a foundation fabric identical to that according to the present invention, but inverting the front and back faces, both durability and noise level deteriorate greatly, as is clear from Comparative Example 1.

I.e., owing to the constitution according to the present invention, it has been possible for the first time to accomplish a toothed belt with both improved durability and low noise level.

What is claimed is:

1. A toothed belt having toothed engaging surfaces and a fabric adhesive-bonded along the toothed engaging surfaces, the fabric comprising first yarns extending in the longitudinal direction of the belt and second yarns crossing the first yarns, the first and second yarns being woven to form a double-faced twill pattern, and wherein each of the first yarns is false-twisted in a first direction, whereby a first side of the fabric exhibits a greater exposure of the first yarns than the second side of the fabric.

2. The toothed belt according to claim 1, wherein adjacent ones of the first yarns are twisted together in a direction that is opposite to the first direction.

3. The toothed belt according to claim 1, wherein adjacent ones of the first yarns are twisted together in a direction that is the same as the first direction.

4. The toothed belt according to claim 1, wherein adjacent ones of the first yarns extend generally parallel to each other.

5. The toothed belt according to claim 1, wherein the first side of the fabric is bonded to the toothed engaging surfaces.

6. A woven fabric useful for adhesive-bonding along toothed engaging surfaces of a toothed belt, the fabric comprising first yarns extending in the longitudinal direction of the belt and second yarns crossing the first yarns, the first and second yarns being woven to form a double-faced twill pattern, and wherein each of the first yarns is false-twisted in a first direction, whereby a first side of the fabric exhibits a greater exposure of the first yarns than the second side of the fabric.

7. The woven fabric according to claim 6, wherein adjacent ones of the first yarns are twisted together in a direction that is opposite to the first direction.

8. The woven fabric according to claim 6, wherein adjacent ones of the first yarns are twisted together in a direction that is the same as the first direction.

9. The woven fabric according to claim 6, wherein adjacent ones of the first yarns extend generally parallel to each other.

* * * * *